(12) United States Patent
Hsieh

(10) Patent No.: US 8,310,091 B2
(45) Date of Patent: Nov. 13, 2012

(54) MONITORING SYSTEM AND INPUT AND OUTPUT DEVICE THEREOF

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 388 days.

(21) Appl. No.: 12/781,940

(22) Filed: May 18, 2010

(65) Prior Publication Data
US 2011/0215642 A1  Sep. 8, 2011

(30) Foreign Application Priority Data
Mar. 8, 2010 (CN) .......................... 2010 1 0119524

(51) Int. Cl.
*H02J 3/00* (2006.01)
*H02J 1/00* (2006.01)
*H02J 3/14* (2006.01)

(52) U.S. Cl. ................................ 307/31; 307/11; 307/18

(58) Field of Classification Search .................... 307/11, 307/18, 29, 31, 38; 318/471; 361/695; 700/300
See application file for complete search history.

(56) References Cited

U.S. PATENT DOCUMENTS

2005/0217300 A1* 10/2005 Cheng et al. ................. 62/259.2
2009/0125159 A1*  5/2009 Shen et al. ..................... 700/300
* cited by examiner

*Primary Examiner* — Carlos Amaya
(74) *Attorney, Agent, or Firm* — Altis Law Group, Inc.

(57) ABSTRACT

A monitoring system includes a controller, a number of input and output (I/O) devices, a number of sensors, and a number of electronic devices. Each I/O device comprises an input circuit, an output circuit, and a connector. The connector is connected to a sensor or an electronic device. The controller controls the I/O device to function as an input device or an output device. When the I/O device functions as an input device, the input circuit transmits a voltage signal to the controller. When the I/O device functions as an output device, the output circuit supplies power to the electronic device and the controller detects the voltage of the electronic device via the input circuit.

13 Claims, 4 Drawing Sheets

MONITORING SYSTEM AND INPUT AND OUTPUT DEVICE THEREOF

CROSS-REFERENCE

Relevant subject matter is disclosed in six co-pending U.S. patent application Ser. Nos. 12/641,230, 12/781,927, 12/781,933, 12/770,779, 12/781,951, and 12/781,954 assigned to the same assignee as this patent application.

BACKGROUND

1. Technical Field

The present disclosure relates to monitoring systems and, particularly, to a monitoring system with input and output devices.

2. Description of Related Art

In a monitoring system, input devices input detection signals from sensors to a controller, and output devices supplies power to an electronic device. The input devices and output devices are integrated into the monitoring system and the number of input and output devices is fixed. As a result, it is inconvenient to modify such a monitoring system to expand its input and output capability.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements is illustrated by way of example and not by way of limitation. It should be noted that references to "an" or "one" embodiment in this disclosure are not necessarily to the same embodiment, and such references mean at least one.

Figure 1:
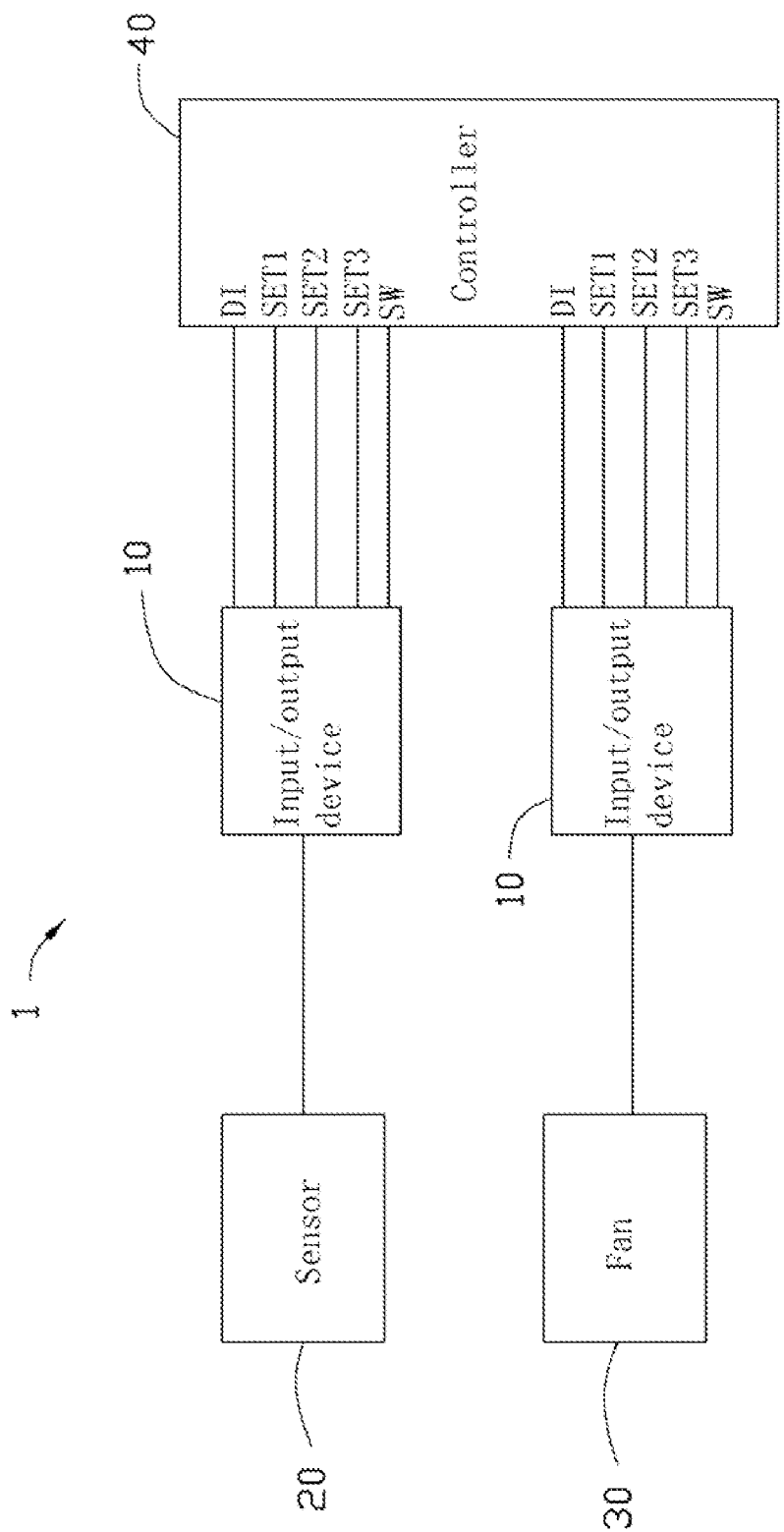
FIG. 1 is a schematic block diagram of an exemplary embodiment of a monitoring system, the monitoring system including input and output (I/O) devices.

Referring to FIG. 1, an exemplary embodiment of a monitoring system 1 includes two input and output (I/O) devices 10, a sensor 20, an electronic device, and a controller 40. In another embodiment, the monitoring system 1 may include a plurality of I/O devices 10, a plurality of sensors 20, a plurality of electronic devices, and a controller 40. In the embodiment, the sensors 20 are temperature sensors and the electronic devices are fans 30. A sum of the sensors 20 and the fans 30 is equal to the number of the I/O devices 10.

The controller 40 includes a plurality of input terminals DI, a plurality of first setting terminals SET1, a plurality of second setting terminals SET2, a plurality of third setting terminals SET3, and a plurality of control terminals SW.

Each I/O device 10 is connected between one of the sensors 20 or one of the fans 30, and the controller 40.

When an I/O device 10 is connected to one of the sensors 20, the I/O device 10 functions as an input device to convert a detecting signal from the sensor 20 to a voltage signal and transmit the voltage signal to the controller 40. When the I/O device 10 is connected to one of the fans 30, the I/O device 10 functions as an output device to supply power to the fan 30.

Figure 2:
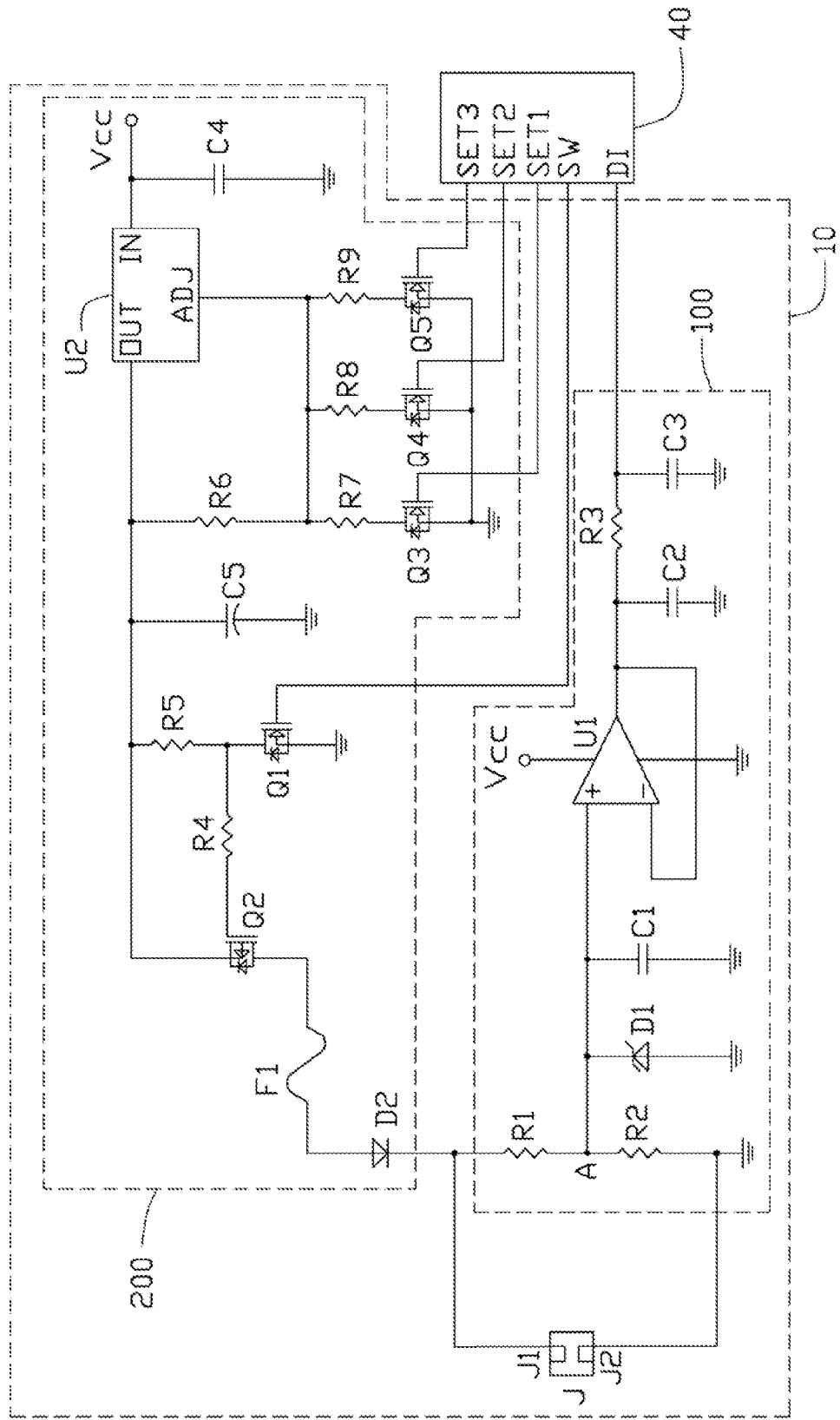
FIG. 2 is a schematic diagram of one of the I/O device of FIG. 1.

Referring to FIG. 2, the I/O device 10 includes an input circuit 100, an output circuit 200, and a connector J. The input circuit 100 is connected between an input terminal DI of the controller 40 and the connector J. The output circuit 200 is connected between a control terminal SW of the controller 40 and the connector J. The output circuit 200 is also connected to a first setting terminal SET1, a second setting terminal SET2, and a third setting terminal SET3 of the controller 40. The connector J is connected to the sensor 20 or the fan 30.

When the I/O device 10 functions as an input device, the output circuit 200 does not work. The input circuit 100 converts the detecting signal of the sensor 20 to a voltage signal and transmits the voltage signal to the controller 40. When the I/O device 10 functions as an output device, the output circuit 200 supplies power to the fan 30 and the controller 40 detects the voltage across the fan 30 via the input circuit 100.

The input circuit 100 includes a voltage stabilizing diode D1, an operational amplifier (opamp) U1, resistors R1-R3, and capacitors C1-C3.

A first terminal of the resistor R2 is connected to a first terminal J1 of the connector J via the resistor R1. A second terminal of the resistor R2 is connected to a second terminal J2 of the connector J and grounded.

A cathode of the voltage stabilizing diode D1 is connected to a node A between the resistors R1 and R2. An anode of the voltage stabilizing diode D1 is grounded.

A non-inverting input of the opamp U1 is connected to the cathode of the voltage stabilizing diode D1, and grounded via the capacitor C1. An inverting input of the opamp U1 is connected to an output of the opamp U1. A power terminal of the opamp U1 is connected to a power source Vcc. A ground terminal of the opamp U1 is grounded. The output of the opamp U1 is also grounded via the capacitor C2.

A first terminal of the resistor R3 is connected to the output of the opamp U1. A second terminal of the resistor R3 is connected to the input terminal DI of the controller 40 and grounded via the capacitor C3. The resistor R3 and the capacitors C2 and C3 compose a pi-type filter to filter high frequency signals from the output of the opamp U1.

The output circuit 200 includes a first metal-oxide-semiconductor field effect transistor (MOSFET) Q1, a second MOSFET Q2, three third MOSFET Q3-Q5, a fuse F1, a diode D2, a voltage regulator U2, capacitors C4 and C5, and resistors R4-R9. The first MOSFET Q1 and the third MOSFETs Q3-Q5 are n-channel MOSFETs. The second MOSFET Q2 is a p-channel MOSFET.

A gate of the first MOSFET Q1 is connected to the control terminal SW of the controller 40. A source of the first MOSFET Q1 is grounded. A gate of the second MOSFET Q2 is connected to a drain of the first MOSFET Q1 via the resistor R4. A source of the second MOSFET Q2 is connected to the drain of the first MOSFET Q1 via the resistor R5. An anode of the diode D2 is connected to a drain of the second MOSFET Q2 via the fuse F1. A cathode of the diode D2 is connected to the first terminal J1 of the connector J.

The voltage regulator U2 is an AIC1084 voltage regulator. The voltage regulator U2 includes an input IN, an output OUT, and an adjusting terminal ADJ. The input IN of the voltage regulator U2 is connected to the power source Vcc and grounded via the capacitor C4. The output OUT of the voltage regulator U2 is connected to the source of the second MOSFET Q2 and a first terminal of the resistor R6. The output OUT of the voltage regulator U2 is also grounded via the capacitor C5. A gate of the third MOSFET Q3 is connected to the first setting terminal SET1 of the controller 40. A gate of the third MOSFET Q4 is connected to the second setting terminal SET2 of the controller 40. A gate of the third MOSFET Q5 is connected to the third setting terminal SET3 of the controller 40. A drain of the third MOSFET Q3 is connected to the adjusting terminal ADJ and a second terminal of the resistor R6 via the resistor R7. A drain of the third MOSFET Q4 is connected to the adjusting terminal ADJ via the resistor R8. A drain of the third MOSFET Q5 is connected to the adjusting terminal ADJ via the resistor R9. Sources of the third MOSFETs Q3-Q5 are grounded.

When one of the first setting terminal SET1, the second setting terminal SET2, and the third setting terminal SET3 of the controller 40 is at a high voltage level, one of the third MOSFETs Q3-Q5 is turned on. The relationship of a reference voltage V-ref at the adjusting terminal of the voltage regulator U2, the voltage V-out at the output OUT of the voltage regulator U2, the resistance of the resistor R6, and the resistance Rn of one of the resistors R7-R9 connected to the third MOSFET which is turned on, is shown below.

$$V\text{-}out = V\text{-}ref \times (1 + R6/Rn)$$

Figure 3:
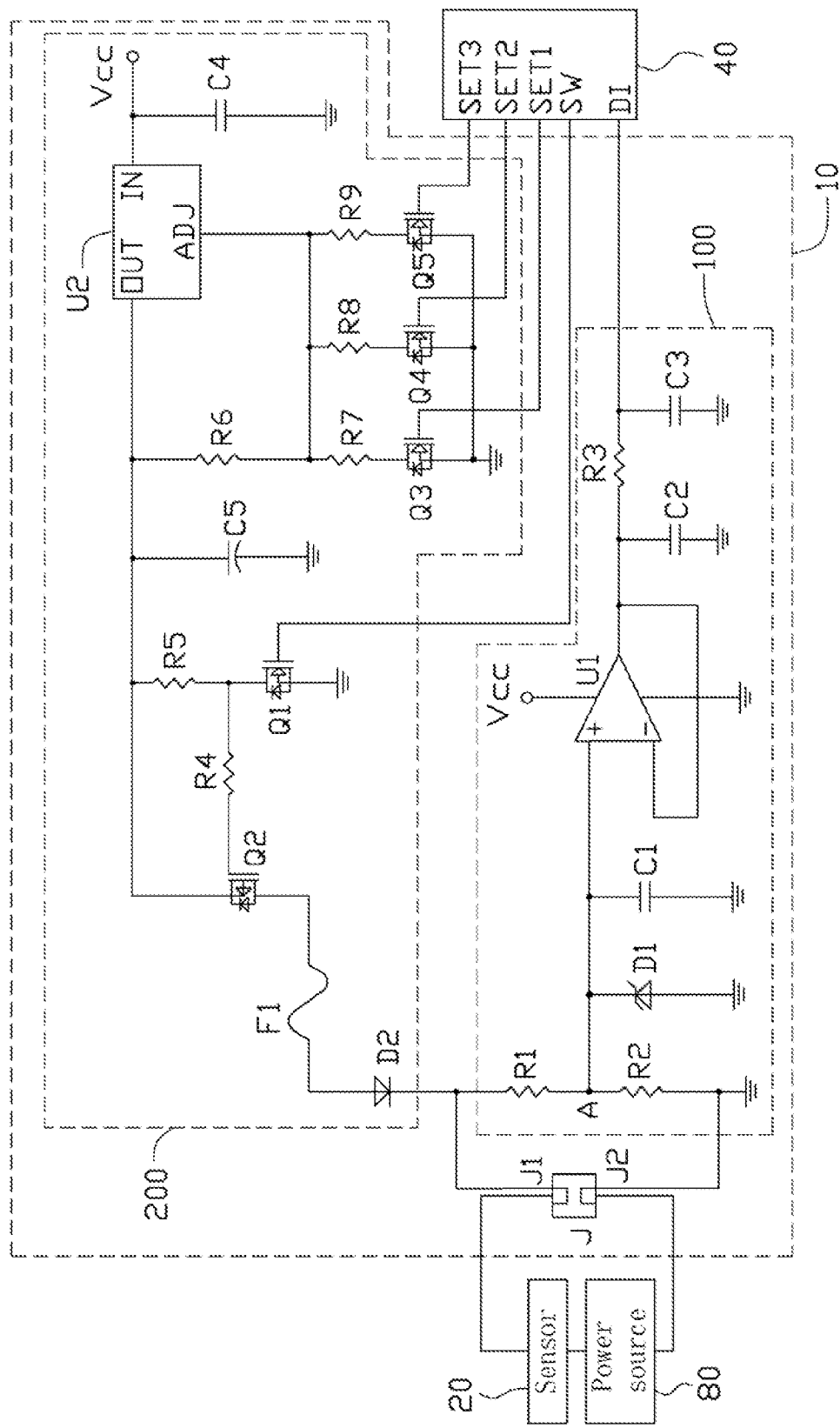
FIG. 3 is a schematic circuit diagram of one of the I/O devices of FIG. 2, functioning as an input device.

Referring to FIG. 3, when the first terminal J1 of the connector J, one of the sensors 20, a power source 80, and the second terminal J2 of the connector J are connected in series, the control terminal SW of the controller 40 is set at a low voltage level. The first MOSFET Q1 of the output circuit 200 is turned off. The gate of the second MOSFET Q2 is at a high voltage level. The second MOSFET Q2 is turned off. The sensor 20, the power source 80, and the resistors R1 and R2 compose a loop.

The sensor 20 detects temperature, and the voltage Vb of the node between the resistor R1 and the first terminal J1 of the connector J changes corresponding to changing of the temperature. The relationship of the voltage Vb of the node between the resistor R1 and the first terminal J1 of the connector J, the voltage Va of the node A, resistances of the resistors R1 and R2 is shown below.

$$Va = Vb \times R2/(R1+R2)$$

The input terminal DI of the controller 40 receives the output of the opamp U1 via the resistor R3. The output of the opamp U1 is approximately equal to the input voltage Va. The controller 40 stores a plurality of voltage values and a plurality of corresponding temperature values. The controller 40 determines temperature by comparing the input voltage Va with the temperature values.

Figure 4:
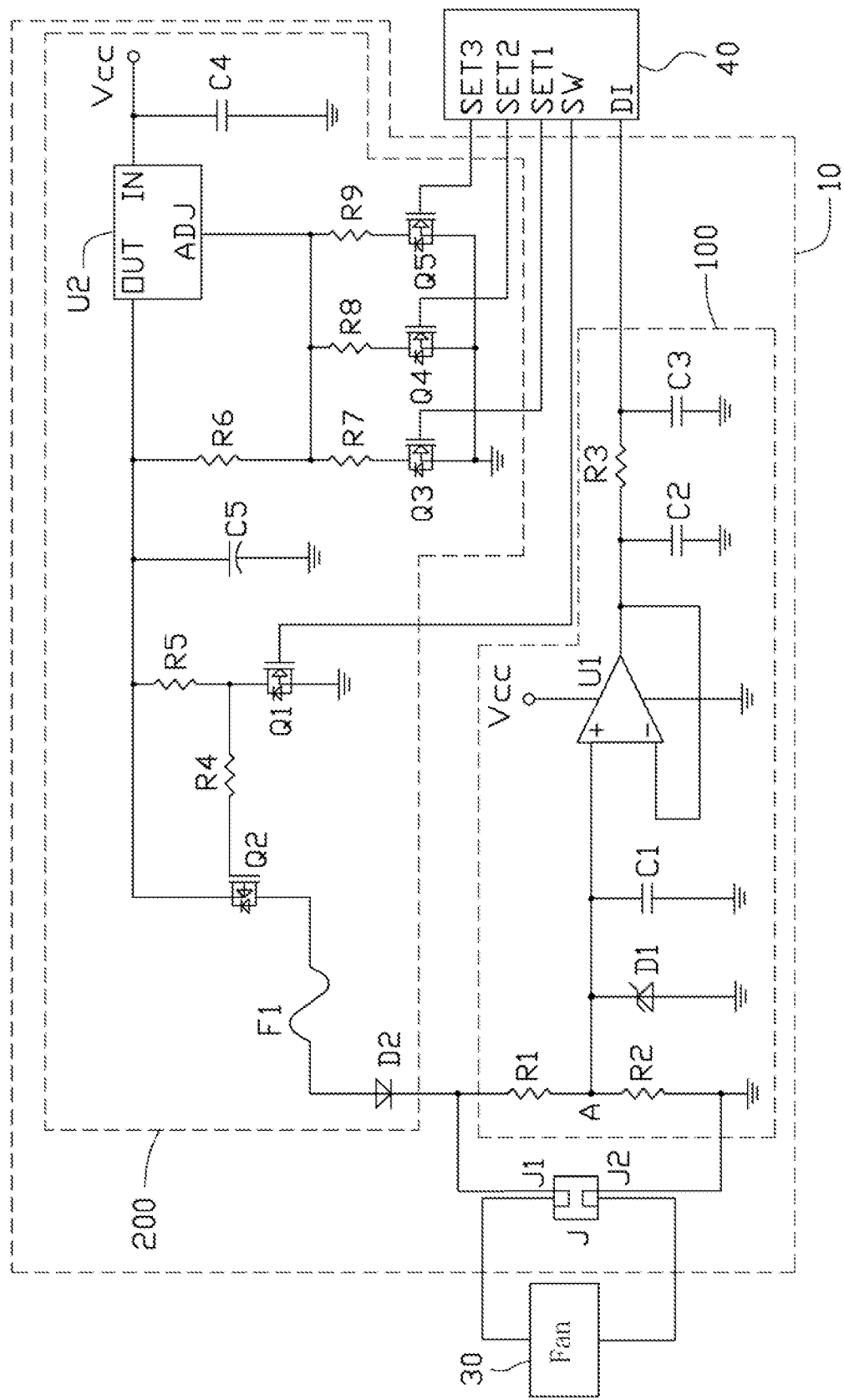
FIG. 4 is a schematic circuit diagram of one of the I/O devices of FIG. 2, functioning as an output device.

Referring to FIG. 4, when the first terminal J1 of the connector J, one of the fans 30, and the second terminal J2 of the connector J are connected in series, the control terminal SW of the controller 40 is set at a high voltage level. The first MOSFET Q1 of the output circuit 200 is turned on. The gate of the second MOSFET Q2 is at a low voltage level. The second MOSFET Q2 is turned on.

The controller 40 controls one of the first setting terminal SET1, the second setting terminal SET2, and the third setting terminal SET3 to be at a high voltage level. One of the third MOSFETs Q3-Q5 is turned on. For example, when the first setting terminal SET1 is at a high voltage level, the third MOSFET Q3 is turned on. The output OUT of the voltage regulator U2 outputs a voltage signal and supplies power to the fan 30 via the second MOSFET Q2, the fuse F1, and the diode D2. The relationship of the voltage Vb of the node between the resistor R1 and the diode D2, the voltage Va of the node A, resistances of the resistors R1 and R2 is shown below.

$$Va = Vb \times R2/(R1+R2)$$

The input terminal DI of the controller 40 receives the output of the opamp U1 via the resistor R3. The output of the opamp U1 is approximately equal to the input voltage Va. The controller 40 detects the voltage across the fan 30 by detecting the input voltage Va.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A monitoring system, comprising:
   a controller comprising a plurality of input terminals, a plurality of setting terminals, and a plurality of control terminals;
   a plurality of sensors;
   a plurality of electronic devices; and
   a plurality of input and output (I/O) devices, wherein a sum of the sensors and the electronic devices is equal to a number of the I/O devices, each I/O device comprises an input circuit, an output circuit, and a connector, the connector is connected to one of the sensors or one of the electronic devices, the input circuit is connected between an input terminal of the controller and the connector, the output circuit is connected between a control terminal of the controller and the connector, the output circuit comprises a voltage regulator connected to the setting terminals of the controller, wherein the controller outputs a control signal to the output circuit and controls the I/O device to function as an input device or an output device, wherein when the I/O device functions as an input device, the input circuit converts a detecting signal of the sensor to a voltage signal and transmits the voltage signal to the controller; wherein when the I/O device functions as an output device, the output circuit supplies power to the electronic device and the controller detects the voltage of the electronic device via the input circuit.

2. The monitoring system of claim 1, wherein the sensors are temperature sensors.

3. The monitoring system of claim 1, wherein the electronic devices are fans.

4. The monitoring system of claim 1, wherein the input circuit comprises a voltage stabilizing diode, an operational amplifier (opamp), a first resistor, a second resistor, and a third resistor, a first terminal of the second resistor is connected to a first terminal of the connector via the first resistor, a second terminal of the second resistor is connected to a second terminal of the connector and grounded, a cathode of the voltage stabilizing diode is connected to a node between the first resistor and the second resistor, an anode of the voltage stabilizing diode is grounded, a non-inverting input of the opamp is connected to the cathode of the voltage stabilizing diode, an inverting input of the opamp is connected to an output of the opamp, a first terminal of the third resistor is connected to the output of the opamp, a second terminal of the third resistor is connected to the input terminal of the controller.

5. The monitoring system of claim 4, wherein the output circuit comprises a first metal-oxide-semiconductor field effect transistor (MOSFET), a second MOSFET, a diode, and a plurality of third MOSFETs, a gate of the first MOSFET is connected to the control terminal of the controller, a source of the first MOSFET is grounded, a gate of the second MOSFET is connected to a drain of the first MOSFET via a fourth resistor, a source of the second MOSFET is connected to the drain of the first MOSFET via a fifth resistor, an anode of the diode is connected to a drain of the second MOSFET, a cathode of the diode is connected to the first terminal of the connector, the voltage regulator includes an input, an output, and an adjusting terminal, the input of the voltage regulator is connected to a power source, the output of the voltage regulator is connected to the source of the second MOSFET, a gate of each third MOSFET is connected to a corresponding setting terminal of the controller, drains of the third MOSFETs are connected to the adjusting terminal via sixth, seventh, and eighth resistors, respectively, a source of each third MOSFET is grounded.

6. The monitoring system of claim 5, wherein the first MOSFET and the third MOSFETs are n-channel MOSFETs, the second MOSFET is a p-channel MOSFET.

7. The monitoring system of claim 5, wherein the anode of the diode is connected to the drain of the second MOSFET via a fuse.

8. An input and output (I/O) device connected between a controller and a sensor or an electronic device, the I/O device comprising:
a connector connected to the sensor or the electronic device;
an input circuit connected between an input terminal of the controller and the connector;
an output circuit connected between a control terminal of the controller and the connector, wherein the output circuit comprises a voltage regulator connected to setting terminals of the controller, wherein the controller outputs a control signal to the output circuit and controls the I/O device to function as an input device or an output device, wherein when the I/O device functions as an input device, the input circuit converts a detecting signal of the sensor to a voltage signal and transmits the voltage signal to the controller, wherein when the I/O device functions as an output device, the output circuit supplies power to the electronic device and the controller detects the voltage of the electronic device via the input circuit.

9. The I/O device of claim 8, wherein the sensor is a temperature sensor.

10. The I/O device of claim 8, wherein the input circuit comprises a voltage stabilizing diode, an operational amplifier (opamp), a first resistor, a second resistor, and a third resistor, a first terminal of the second resistor is connected to a first terminal of the connector via the first resistor, a second terminal of the second resistor is connected to a second terminal of the connector and grounded, a cathode of the voltage stabilizing diode is connected to a node between the first resistor and the second resistor, an anode of the voltage stabilizing diode is grounded, a non-inverting input of the opamp is connected to the cathode of the voltage stabilizing diode, an inverting input of the opamp is connected to an output of the opamp, a first terminal of the third resistor is connected to the output of the opamp, a second terminal of the third resistor is connected to the input terminal of the controller.

11. The I/O device of claim 10, wherein the output circuit comprises a first metal-oxide-semiconductor field effect transistor (MOSFET), a second MOSFET, a diode, and a plurality of third MOSFETs, a gate of the first MOSFET is connected to the control terminal of the controller, a source of the first MOSFET is grounded, a gate of the second MOSFET is connected to a drain of the first MOSFET via a fourth resistor, a source of the second MOSFET is connected to the drain of the first MOSFET via a fifth resistor, an anode of the diode is connected to a drain of the second MOSFET, a cathode of the diode is connected to the first terminal of the connector, the voltage regulator includes an input, an output, and an adjusting terminal, the input of the voltage regulator is connected to a power source, the output of the voltage regulator is connected to the source of the second MOSFET, a gate of each third MOSFET is connected to a corresponding setting terminal of the controller, drains of the third MOSFETs are connected to the adjusting terminal via sixth, seventh, eighth resistors, respectively, a source of each third MOSFET is grounded.

12. The I/O device of claim 11, wherein the first MOSFET and the third MOSFETs are n-channel MOSFETs, the second MOSFET is a p-channel MOSFET.

13. The I/O device of claim 11, wherein the anode of the diode is connected to the drain of the second MOSFET via a fuse.

* * * * *